(12) United States Patent
Sun

(10) Patent No.: US 8,583,606 B2
(45) Date of Patent: Nov. 12, 2013

(54) STORING METHOD OF PERFORMANCE DATA AND SYSTEM THEREOF

(75) Inventor: Ming Sun, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/497,857

(22) PCT Filed: Jun. 3, 2010

(86) PCT No.: PCT/CN2010/073505
§ 371 (c)(1),
(2), (4) Date: Mar. 23, 2012

(87) PCT Pub. No.: WO2011/035605
PCT Pub. Date: Mar. 31, 2011

(65) Prior Publication Data
US 2013/0006982 A1    Jan. 3, 2013

(30) Foreign Application Priority Data
Sep. 25, 2009   (CN) .......................... 2009 1 0177844

(51) Int. Cl.
*G06F 7/00*   (2006.01)
*G06F 17/00*  (2006.01)

(52) U.S. Cl.
USPC ........................................ 707/687; 707/688

(58) Field of Classification Search
USPC ................................................. 707/687, 688
See application file for complete search history.

(56) References Cited

U.S. PATENT DOCUMENTS

| | | | |
|---|---|---|---|
| 6,622,177 B1 * | 9/2003 | Eilert et al. | 710/3 |
| 2005/0027727 A1 * | 2/2005 | Garcea et al. | 707/100 |
| 2007/0283107 A1 * | 12/2007 | Ozaki et al. | 711/154 |
| 2009/0150542 A1 * | 6/2009 | Yahiro et al. | 709/224 |
| 2009/0299966 A1 * | 12/2009 | Schneider | 707/3 |
| 2011/0295993 A1 * | 12/2011 | Ochi et al. | 709/223 |

FOREIGN PATENT DOCUMENTS

| | | |
|---|---|---|
| CN | 1756190 A | 4/2006 |
| CN | 101183993 A | 5/2008 |
| CN | 101321090 A | 12/2008 |
| CN | 101321354 A | 12/2008 |

* cited by examiner

Primary Examiner — Hares Jami
(74) Attorney, Agent, or Firm — McClure, Qualey & Rodack, LLP

(57) ABSTRACT

A method and system for storing performance data are disclosed, and the method includes: during a process of adding a collection point, a system creating a data subtable in real time according to the number of added collection points and a predetermined maximum number of collection points of the data subtable; and storing the performance data of the collection point into the created data subtable, and storing the corresponding relationship between the collection point and the data subtable.

8 Claims, 2 Drawing Sheets

STORING METHOD OF PERFORMANCE DATA AND SYSTEM THEREOF

CROSS REFERENCE RELATED APPLICATIONS

This application is a national phase of PCT/CN2010/073505 filed Jun. 3, 2010, which claims priority to China Application Serial No. 200910177844.2, filed Sep. 25, 2009, both of which are entirely incorporated herein by reference.

TECHNICAL FIELD

The present invention relates to the performance collection field of the device managing system in the field of communication, and in particular, to a method and system for storing performance data.

BACKGROUND ART

In a performance collection system, it often needs to periodically collect a plurality of kinds of performance items from a plurality of collection points of a device. The collection point refers to a physical entity on the device that can provide collection and statistics of performance data and is an appointed source on the device for obtaining performance data. These performance data will be stored in a database, and moreover are to be capable of generating data reports with a greater granularity periodically. Condition query will be often performed on the data in the reports to display the data in a report query Graphical User Interface (GUI), and overdue data in these reports are to be able of being deleted periodically.

The current storages of performance data are all done in the following way: one kind of performance items is stored in one database table, and the report data with the same generation granularity of the same kind of performance item are stored in one database table. When the collection scale is very large, that is, when the number of collection points is too big, a larger amount of processing on performance data will be involved, including storage of these data, deletion of overdue data and condition query of these data. Because the data quantity is too big, when a data table stores a large volume of data, basic operations such as Create, Update, Read, Delete (CURD) will all affect each other, thereby reducing the processing efficiency and influencing the availability of the system itself.

SUMMARY OF THE INVENTION

The technical problem to be solved in the present invention is to provide a method and system for storing performance data to overcome the problem in the related art that the each operation in the database has a low efficiency and affects each other when the data amount in the database table is too big.

In order to solve the above problem, the present invention provides a method for storing performance data, comprising the following steps of:

during a process of adding a collection point, a system creating a data subtable in real time according to a number of collection points that have been added and a predetermined maximum number of collection points of the data subtable; and the system storing the performance data of the collection point into the created data subtable, and storing a corresponding relationship between the collection point and the data subtable.

Before the step of creating the data subtable in real time, the method further comprises: judging whether any data subtable has been created, and judging whether the number of the collection points stored in the last created data subtable reaches the maximum number of collection points;

the step of creating the data subtable in real time comprises: creating a new data subtable if it is judged that no data subtable is created, or if it is judged that the number of the collection points stored in the last created data subtable reaches the maximum number of collection points;

the step of storing the performance data of the collection point into the created data subtable comprises: storing the performance data of the added collection point into the new data subtable.

The step of storing the performance data of the collection point into the created data subtable further comprises: storing the received performance data of the collection point into the last created data subtable if the system judges that the data subtable has been created and the number of the collection points stored in the last created data subtable does not reach the maximum number of collection points.

The system determines the maximum number of collection points of the data subtable according to configuration parameters of the data subtable, wherein, the configuration parameters of the data subtable comprise an optimal number of records, a collecting period for performance data and an expiration deleting period for performance data.

The method further comprises: when receiving an addition operation or a query operation initiated by a user, the system searching for the data subtable corresponding to the collection point involved in the addition operation or query operation of the user in the stored corresponding relationship between each collection point and the data subtable, constructing a data subtable name according to an identifier of the data subtable that has been searched out, and composing a structured query language statement according to the constructed data subtable name to implement the addition or query operation initiated by the user.

The present invention further discloses a system for storing performance data, comprising a data subtable creating module, a storing module and a mapping module, wherein:

the data subtable creating module is configured to, during a process of the present system adding a collection point, create a data subtable for storing the performance data of the collection point in real time according to a number of collection points that have been added and the predetermined maximum number of collection points of the data subtable;

the storing module is configured to store the performance data of the added collection point into the data subtable created by the data subtable creating module;

the mapping module is configured to store a corresponding relationship between each collection point and the data subtable storing the each collection point.

The data subtable creating module is further configured to judge whether any data subtable has been created, and judge whether the number of the collection points in the last created data subtable reaches the maximum number of collection points;

the data subtable creating module is configured to create the data subtable in real time in the following way: creating a new data subtable if the data subtable creating module judges that no data subtable is created, or that the number of the collection points stored in the last created data subtable reaches the maximum number of collection points;

the storing module is configured to store the performance data of the added collection point into the new data subtable.

The data subtable creating module is further configured to not create any new data subtable if it is judged that the data subtable has been created and the number of the collection points stored in the last created data subtable does not reach the maximum number of collection points;

the storing module is configured to store the performance data of the added collection point into the last created data subtable.

The data subtable creating module is configured to determine the maximum number of collection points of the data subtable according to configuration parameters of the data subtable, wherein, the configuration parameters of the data subtable comprise an optimal number of records, a collecting period for performance data and an expiration deleting period for performance data.

The system further comprises a processing module, which is configured to receive an addition operation or a query operation initiated by a user, search for the data subtable corresponding to the collection point involved in the addition operation or query operation of the user from the mapping module, construct a data subtable name according to an identifier of the data subtable that has been searched out, and compose a structured query language statement according to the constructed data subtable name to implement the addition or query operation initiated by the user.

In the technical scheme of the present invention, since the logic data of one database table are stored in many subtables, the operation originally implemented on one database table can be distributed to a plurality of subtables, thereby greatly increasing the processing efficiency of the operation of the database and improving the availability of the system. The technical scheme of the present invention is quite suitable for a performance collecting system where the data of a database table are associated with a certain kind of entity (for example a collection point entity) and the entity-associated data are with periodic storage, periodic deletion and frequent accesses.

PREFERRED EMBODIMENTS OF THE PRESENT INVENTION

Figure 1:
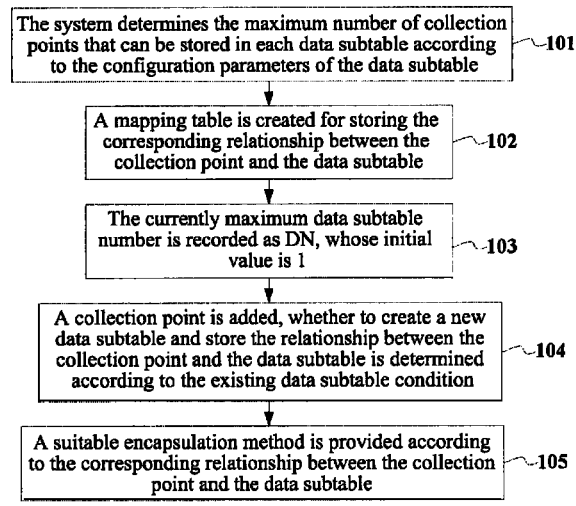
FIG. 1 is a flowchart of storing performance data according to an example of the present invention.

The main conception of the present invention is that the data in the existing one data table are stored in a plurality of data subtables, and specifically the maximum number of collection points that can be stored in each data subtable is determined according to the optimal number of records that can be stored in each data table (i.e., each operation for this database table can have a balanced efficiency with the optimal number of records), the collecting period for performance data and the expiration deleting period for performance data, and the plurality of data subtables are dynamically created according to the practical condition of collection point addition.

The technical scheme of the present invention will be further described in detail below with reference to the drawings and specific examples.

A system for storing performance data comprises a data subtable creating module, a storing module and a mapping module, wherein:

the data subtable creating module is configured to create a data subtable for storing the performance data of the collection point in real time according to a predetermined maximum number of collection points of the data subtable;

wherein, the data subtable creating module is configured to determine the maximum number of collection points of a data subtable according to configuration parameters of the data subtable, and the configuration parameters of the data subtable may comprise an optimal number of records, a collecting period for performance data and an expiration deleting period for performance data;

specifically, when receiving a collection point, the data subtable creating module creates a new data subtable if the data subtable creating module judges that no data subtable is created, or that the number of the collection points stored in the last created data subtable (in this example, the last created data subtable refers to the data subtable with the maximum subtable number among the data subtables that have been created) reaches the predetermined maximum number of collection points, and updates the new data subtable to be the data subtable with the maximum subtable number in the system; the data subtable creating module does not create any new data subtable if it judges that the data subtable has been created and the number of the collection points stored in the last created data subtable (i.e., the data subtable with the maximum subtable number among the data subtables that have been created in this example) does not reach the maximum number of collection points.

The storing module is configured to store the received performance data of the collection point into the data subtable created by the data subtable creating module;

wherein, the data subtable creating module always stores the performance data of the added collection point into the data subtable with the maximum subtable number currently in the system.

The mapping module is configured to store the corresponding relationship between each collection point identifier and the data subtable storing the performance data of each collection point, that is, indicating which data subtable the performance data of each collection point are stored, and specifically, the mapping module can store the corresponding relationship by adopting a form of a mapping table.

The processing module is configured to receive an addition operation or a query operation initiated by a user, and at this moment, search for the data subtable corresponding to the collection point (i.e., the collection point to which the performance data added or queried by the user belong) involved in the operation of the user from the mapping module, construct a data subtable name according to an identifier of the data subtable that has been searched out, and compose a structured query language (SQL) statement according to the constructed data subtable name, thereby implementing the addition or query operation initiated by the user.

The specific process of the above system storing performance data will be introduced below, which comprises the following steps, as shown in FIG. 1.

In step 101, the system determines the maximum number of collection points that can be stored in each data subtable according to the configuration parameters of the data subtable.

In this step, the configuration parameters of the data subtable comprise an optimal number of records, a collecting period for performance data and an expiration deleting period for performance data, etc.; wherein, the system can obtain the configuration parameters of the data subtable from a configuration file or the system sets each configuration parameter for the data subtable.

In step 102, a mapping table is created for storing the corresponding relationship between the collection point and the data subtable.

In this step, the corresponding relationship between the collection point and the data subtable refers to the corresponding relationship between the collection point identifier and the data subtable identifier (for example, the data subtable number) for indicating which data subtable the performance data of each collection point are stored.

In step 103, the currently maximum data subtable number is recorded as DN, whose initial value is 1.

In step 104, a collection point is added, whether to create a new data subtable and store the relationship between the collection point and the data subtable is determined according to the existing data subtable condition, wherein, when a new data subtable is created, the currently maximum data subtable number DN should also be updated in real time.

In step 105, a suitable encapsulation method is provided according to the corresponding relationship between the collection point and the data subtable such that the operation on the data (adding recording or querying) seems to be still implemented in one table.

After the above flow achieving storage of performance data, the system also deletes the overdue performance data in each data subtable in real time according to the expiration deleting period for performance data.

In other examples, when the performance collecting system needs to collect a plurality of performance items, similar processing may be implemented according to the above flow, and if the collecting periods and deleting periods of all performance times are the same, the above steps of 101, 102, 103 can be uniform, and when the table name is constructed according to the subtable number, the specific performance item name can be used.

Figure 2:
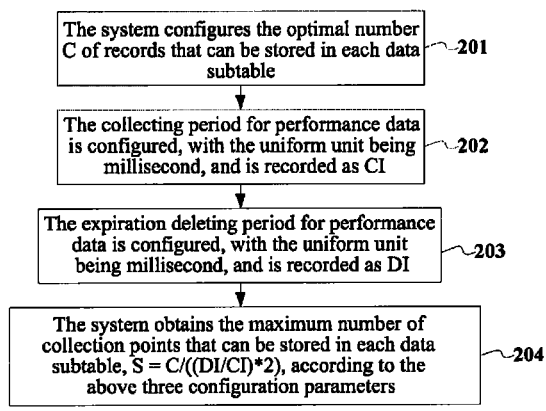
FIG. 2 is a flowchart of determining the number of collection points that can be stored in each data subtable in the flow shown in FIG. 1.

In the above step 101, the specific process of determining the maximum number of collection points that can be stored in each data subtable comprises the following steps, as shown in FIG. 2.

In step 201, the system configures the optimal number C of records that can be stored in each data subtable.

In this step, when the system configures the optimal number C of records, it is required that each operation for this data subtable can have a balanced efficiency with this number of records, which can be set specifically according to the selected database product and the machine configuration. For example, when a MSSQL database is used, the optimal number C of records that can be stored in the data subtable can be 2 million.

In step 202, the collecting period for performance data is configured, with a uniform unit being millisecond, and is recorded as CI.

In step 203, the expiration deleting period for performance data is configured, with a uniform unit being millisecond, and is recorded as DI.

In the above steps of 202 and 203, the collecting period and deleting period configured by the system are both associated with the practical application, wherein, the collecting period refers to how often the data is collected, for example every five minutes, and the expiration deleting period refers to the period during which the performance data can be stored.

In step 204, the system obtains the maximum number of collection points that can be stored in each data subtable, $S=C/((DI/CI)*2)$, according to the above three configuration parameters.

Figure 3:
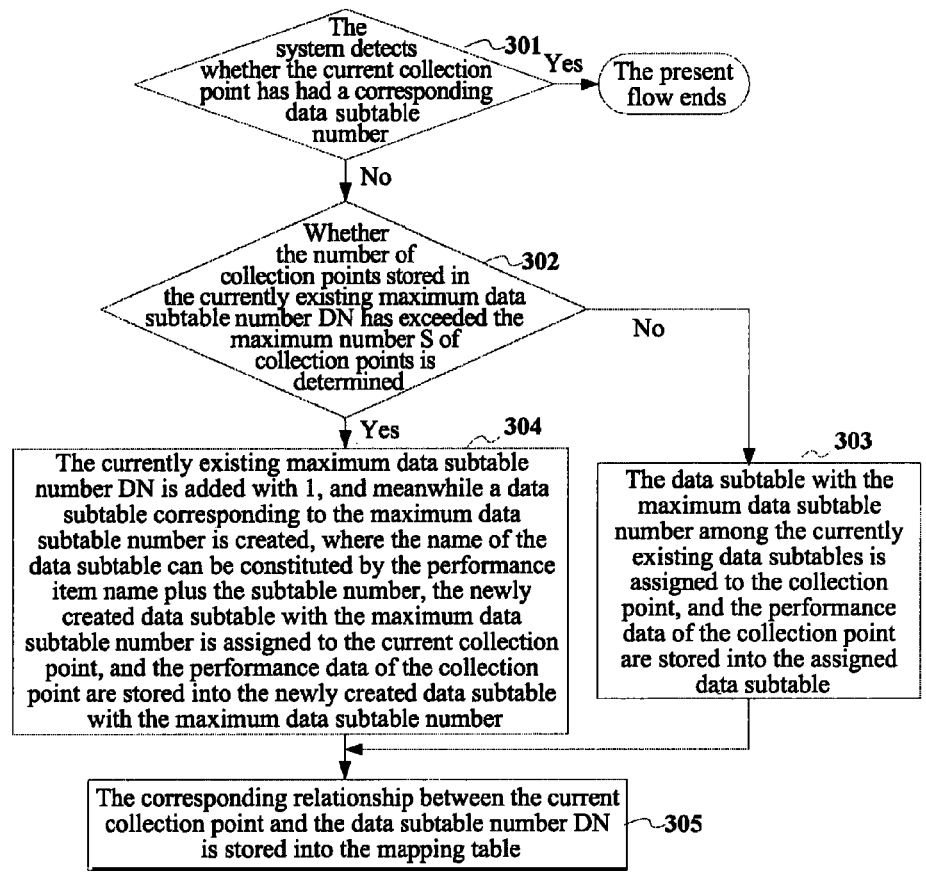
FIG. 3 is a flowchart of creating a subtable in the light of the conditions when a collection point is added in the flow shown in FIG. 1.

In the above step 104, the specific process of determining whether to create a new data subtable according to the existing data subtable condition when a collection point is added and store the relationship between the collection point and the data subtable determined and updating the current maximum data subtable number DN in real time, as shown in FIG. 3, comprises the following steps.

In step 301, the system detects whether the current collection point has had a corresponding data subtable number, if yes, the present flow is ended without any operation, or else step 302 is executed.

In step 302, whether the number of collection points stored in the currently existing maximum data subtable number DN (i.e., the data subtable created the latest time) has exceeded the maximum number S of collection points is determined, if yes, step 304 is executed, or else step 303 is executed.

In step 303, the data subtable with the maximum data subtable number among the currently existing data subtables is assigned to the collection point, and the performance data of the collection point are stored into the assigned data subtable (i.e., the currently existing maximum data subtable), proceeding to step 305.

In step 304, the currently existing maximum data subtable number DN is added with 1, and meanwhile a data subtable corresponding to the maximum data subtable number is created, where the name of the data subtable can be constituted by the performance item name plus the subtable number, the newly created data subtable with the maximum data subtable number is assigned to the current collection point, and the performance data of the collection point are stored into the newly created data subtable with the maximum data subtable number.

In step 305, the corresponding relationship between the current collection point and the data subtable number DN is stored into the mapping table.

Figure 4:
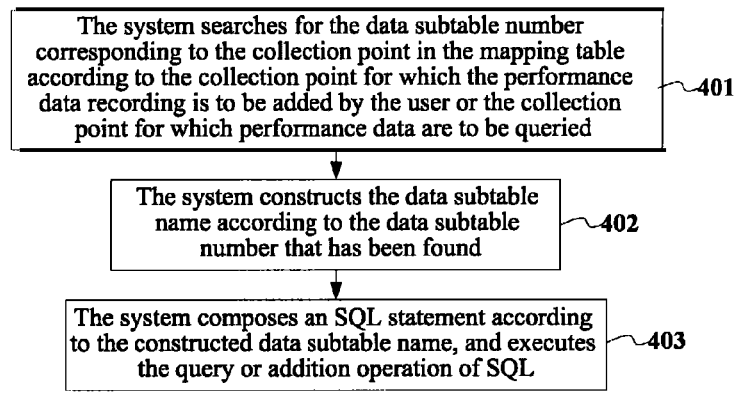
FIG. 4 is a flowchart of implementing operation on the database by providing an encapsulation method in the flow shown in FIG. 1.

In the above step 105, the specific process of providing a suitable encapsulation method according to the corresponding relationship between the collection point and the data subtable such that the operation on the data (adding recording or querying) seems to be still implemented in one table, as shown in FIG. 4, comprises the following steps.

In step 401, the system searches for the data subtable number corresponding to the collection point in the mapping table according to the collection point for which the performance data recording is to be added by the user or the collection point for which performance data are to be queried.

In step 402, the system constructs the data subtable name according to the data subtable number that has been found, wherein the data subtable name may be the performance item plus the subtable number.

In step 403, the system composes an SQL statement according to the constructed data subtable name, and executes the query or addition operation of SQL.

It can be seen from the above examples that in the technical scheme of the present invention, the data that should have been stored in one data table are dispersed into a plurality of data tables, which are dynamically created according to the requirements for adding collection points, so the operation pressure of the CURD database is shared, and the maximum number of records of each database is efficiently ensured, thereby improving the availability of the system. Moreover, in the technical scheme of the present invention, a suitable encapsulating method is provided according to the corresponding relationship between the collection point and the subtable number so that the operations on the database such as addition, deletion and query seem to be still performed in one table in the view of outside, thereby enhancing the ease of use and meanwhile providing a good encapsulation for the interior logic processing.

The above examples are only preferred examples of the present invention, and are not used to limit the present invention. For a person having ordinary skill in the art, the present invention may have various modifications and changes. Any modification, equivalent substitution, improvement and so on made within the spirit and principle of the present invention shall fall into the protection scope of the present invention.

INDUSTRIAL APPLICABILITY

The technical scheme of the present invention greatly increases the processing efficiency of the operation of the database and improves the availability of the system. The technical scheme of the present invention is quite suitable for a performance collecting system where the data of a database table are associated with and a certain kind of entity (for example a collection point entity) and the entity-associated data are with periodic storage, periodic deletion and frequent accesses.

What is claimed is:

1. A method for storing performance data, comprising the following steps of:
   a collecting apparatus creating a data subtable in real time according to a number of collection points that have been added and a predetermined maximum number of collection points of the data subtable for a new adding collection point; and
   the collecting apparatus storing the performance data of the collection point into the created data subtable, and storing a corresponding relationship between the collection point and the data subtable;
   wherein the maximum number of collection points of the data subtable be determined according to configuration parameters of the data subtable, wherein, the configuration parameters of the data subtable comprise an optimal number of records, a collecting period for performance data and an expiration deleting period for performance data.

2. The method according to claim 1, wherein,
   before the step of creating the data subtable in real time, the method further comprises: judging whether any data subtable has been created, and judging whether the number of the collection points stored in the last created data subtable reaches the maximum number of collection points;
   the step of creating the data subtable in real time comprises: creating a new data subtable if it is judged that no data subtable is created, or it is judged that the number of the collection points stored in the last created data subtable reaches the maximum number of collection points;
   the step of storing the performance data of the collection point into the created data subtable comprises: storing the performance data of the added collection point into the new data subtable.

3. The method according to claim 2, wherein,
   the step of storing the performance data of the collection point into the created data subtable further comprises: storing the received performance data of the collection point into the last created data subtable if the system judges that the data subtable has been created and the number of the collection points stored in the last created data subtable does not reach the maximum number of collection points.

4. The method according to claim 1, wherein, the method further comprises:
   when receiving an addition operation or a query operation initiated by a user, the system searching for the data subtable corresponding to the collection point involved in the addition operation or query operation of the user in the stored corresponding relationship between each collection point and the data subtable, constructing a data subtable name according to an identifier of the data subtable that has been searched out, and composing a structured query language statement according to the constructed data subtable name to implement the addition or query operation initiated by the user.

5. An apparatus for storing performance data, comprising at least one processor executing a data subtable creating module, a storing module and a mapping module, wherein:
   the data subtable creating module is configured to, during a process of the present system adding a collection point, create a data subtable for storing the performance data of the collection point in real time according to a number of collection points that have been added and a predetermined maximum number of collection points of the data subtable;
   the storing module is configured to store the performance data of the added collection point into the data subtable created by the data subtable creating module;
   the mapping module is configured to store a corresponding relationship between each collection point and the data subtable storing the each collection point;
   the data subtable creating module is further configured to determine the maximum number of collection points of the data subtable according to configuration parameters of the data subtable, wherein, the configuration parameters of the data subtable comprise an optimal number of records, a collecting period for performance data and an expiration deleting period for performance data.

6. The apparatus according to claim 5, wherein,
   the data subtablet creating module is further configured to judge whether any data subtables has been created, and judge whether the number of the collection points in the last created data subtable reaches the maximum number of collection points;
   the data subtable creating module is configured to create the data subtable in real time in the following way: creating a new data subtable if the data subtable creating module judges that no data subtable is created, or that the number of the collection points stored in the last created data subtable reaches the maximum number of collection points;
   the storing module is configured to store the performance data of the added collection point into the new data subtable.

7. The apparatus according to claim 6, wherein,
   the data subtable creating module is further configured to not create any new data subtable if it is judged that the data subtable has been created and the number of the collection points stored in the last created data subtable does not reach the maximum number of collection points;
   the storing module is configured to store the performance data of the added collection point into the last created data subtable.

8. The apparatus according to claim 5, wherein, the system further comprises a processing module:

the processing module is configured to receive an addition operation or a query operation initiated by a user, search for the data subtable corresponding to the collection point involved in the addition operation or query operation of the user from the mapping module, organize a data subtable name according to an identifier of the data subtable that has been searched out, and compose a structured query language statement according to the constructed data subtable name to implement the addition or query operation initiated by the user.

* * * * *